(12) United States Patent
Deming, Jr.

(10) Patent No.: US 6,848,395 B2
(45) Date of Patent: Feb. 1, 2005

(54) METHOD AND STRUCTURE FOR ENHANCING AQUARIUMS

(75) Inventor: Robert F. Deming, Jr., New York, NY (US)

(73) Assignee: ID Brands, Inc., New York, NY (US)

( * ) Notice: Subject to any disclaimer, the term of this patent is extended or adjusted under 35 U.S.C. 154(b) by 0 days.

(21) Appl. No.: 10/378,699

(22) Filed: Mar. 4, 2003

(65) Prior Publication Data

US 2004/0194719 A1 Oct. 7, 2004

(51) Int. Cl.⁷ .............................................. A01K 61/00
(52) U.S. Cl. ....................... 119/250; 119/249
(58) Field of Search ............................. 119/250, 246, 119/247, 248, 249, 251, 253, 255

(56) References Cited

U.S. PATENT DOCUMENTS

| | | | | |
|---|---|---|---|---|
| 192,595 A | * | 7/1877 | Palen et al. | 141/59 |
| 1,576,462 A | * | 3/1926 | Polzin | 119/250 |
| 2,059,927 A | * | 11/1936 | Beck | 405/83 |
| 2,512,678 A | * | 6/1950 | Rice | 119/249 |
| 3,304,912 A | * | 2/1967 | Hackman et al. | 119/251 |
| 3,903,844 A | * | 9/1975 | Greenia | 119/250 |
| 3,921,583 A | * | 11/1975 | De Shores | 119/250 |
| 3,991,715 A | * | 11/1976 | Gibson, Jr. | 119/249 |
| 5,067,439 A | * | 11/1991 | Hand | 119/249 |
| 5,230,298 A | * | 7/1993 | Pearce | 119/250 |
| 5,317,991 A | * | 6/1994 | Lee et al. | 119/249 |
| 5,634,433 A | * | 6/1997 | Schmitt | 119/250 |
| 5,970,999 A | * | 10/1999 | Greenia | 137/1 |
| 6,019,064 A | * | 2/2000 | Alarcon | 119/247 |

* cited by examiner

*Primary Examiner*—Yvonne R. Abbott
(74) *Attorney, Agent, or Firm*—Muserlian, Lucas and Mercanti

(57) ABSTRACT

By adding an evacuated vertical structure onto a body of water where part of the structure extends above the body of water, the water level rises into the structure because of the vacuum. Use of the structure increases the overall volume of water in an aquarium and provides added space for fish as well as enhanced viewing of the aquarium.

21 Claims, 14 Drawing Sheets

METHOD AND STRUCTURE FOR ENHANCING AQUARIUMS

BACKGROUND OF THE INVENTION

1. Field of the Invention

The present invention relates to a method and a structure which can be used with an aquarium to both increase the visible volume in the aquarium and provide enhanced viewing of the aquarium.

2. Art Relating to the Invention

Aquariums have been around for centuries. While they can be used to house amphibious animals, such as turtles, or plants, aquariums are generally used to display tropical fish. As used herein, an aquarium includes a tank, bowl, pool or other water-filled enclosure, indoor or outdoor, as well as an enclosed body of water in a man-made structure which is located in a larger body of water, such as a lake or the ocean. A standard indoor aquarium is usually a tank which is rectangular in shape with four glass sides and a bottom which may be slate or glass. In most situations, an indoor aquarium presents one main viewing side, that being the front of the tank. There have been attempts in the past to improve or vary the appearance of aquariums, e.g. by making them hexagonal, square or even round.

One structure that has been recently introduced to enhance viewing of indoor aquariums and to increase the living space of an indoor aquarium is a water bridge. Water bridges are horizontally oriented structures having a horizontally oriented tube with two vertically oriented outlet sections at each end of the horizontally oriented tube. The water bridge either extends between two indoor tanks, with each outlet section being positioned in one of the indoor tanks, or spans one tank having both outlet sections positioned in the same tank. Such water bridges are generally small in volume and suited only for indoor aquariums.

SUMMARY OF THE INVENTION

The present invention improves an aquarium by adding a vertically oriented structure which has an upper portion extending above the top of the aquarium and a lower portion extending into the water. The vertically oriented structure has a single opening at its bottom which is in fluid communication directly with the aquarium, below the water line of the aquarium. As used herein, the term single opening means only one opening. The structure of the present invention is airtight except for the bottom, thus allowing water to be drawn into the structure.

Water is introduced into the structure by either evacuating the structure or inverting a water-filled structure. Fish in the tank can then swim in and out of the structure, thus providing a diversified environment, enhancing the appearance of the aquarium and increasing the volume of the aquarium in a vertical direction thereby providing increased living space for the aquatic animals and plants while maintaining the horizontal area or footprint of the aquarium.

A method has also been invented for filling the stucture of the present invention as well as for filling water bridges with water. The method comprises:

inserting one end of a hose inside the structure or bridge;

connecting a vacuum pump to the other end of the hose; and pumping the air out of the structure while allowing the water in the body of water to rise up into the structure or bridge.

This method allows for very large and heavy structures or water bridges to be filled easily and quickly.

The structure can be any of many different shapes, for example an urban skyline, a skyscraper, a well-known edifice such as The Flatiron Building, a Mayan temple, the Washington Monument, the Eiffel Tower, a space station, a hollow sculpture of a famous person, a representation of other sculpture such as by Naum Gabo, e.g. a bust of Michael Jordan, etc. The structure of the present invention preferably has at least one flat vertical surface so that the fish and water life can be viewed clearly.

The structure of the present invention can be made from any non-porous material to include glass, stone, marble, granite, plastic. Obviously, in order to view the fish, one side should be of a non-colored material such as clear glass, plastic, acrylic or the like. Glass has been found to be advantageous since it can be readily cleaned with an abrasive brush. Joints between the panels are suitably bent, fused, molded, cemented, adhered and/or caulked to make the structure air-tight.

Preferably, the aquarium tank has a means to handle overflow water from the tank.

The bottom of the structure can extend to the bottom of the tank so as to support the structure.

Alternatively, a stand or other arrangement can be employed to support the structure, to include a water bridge.

If the structure is outside, such as in a backyard pond, a lake, or the ocean, heating elements are employed to protect against freezing the water in the structure. To clear the structure of a dead fish or plant debris, an internal magnet with an attached screen controlled by an external magnet can be employed.

BRIEF DESCRIPTION OF THE DRAWINGS

These and other aspects of the present invention may be more fully understood with reference to the drawings wherein.

DETAILED DESCRIPTION OF THE INVENTION

Figure 1:
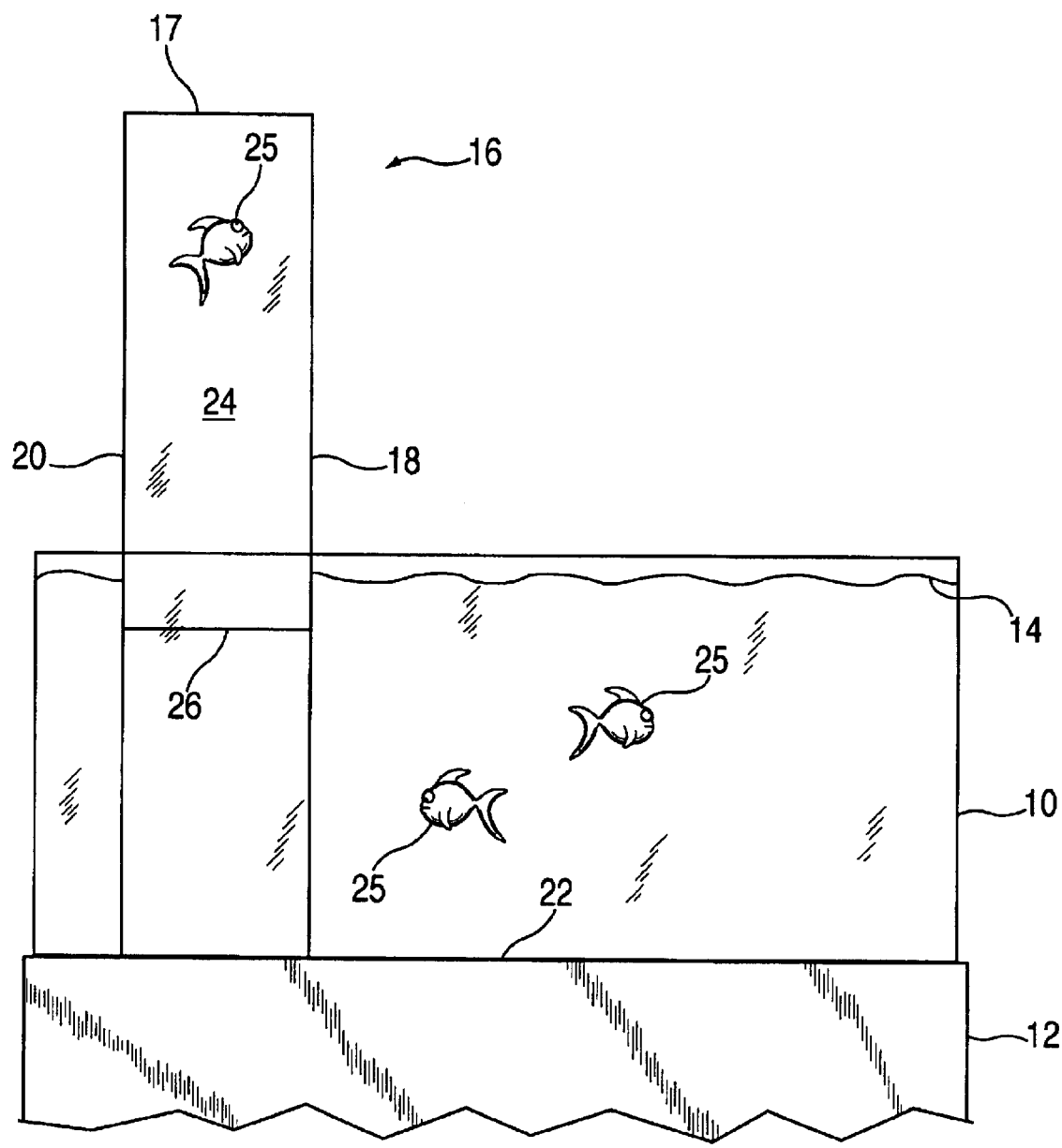
FIG. 1 shows an indoor aquarium having a rectangular shaped structure according to the present invention.

Referring now to FIG. 1, there is shown a standard indoor aquarium comprising a tank 10 resting on a stand 12. Water line 14 represents the top of the water in tank 10. Structure 16, in the shape of a skyscraper, has side walls 18 and 20 which are long enough to extend to the bottom 22 of the tank 10. Front side wall 24 and the rear side wall (not shown) do not extend to the bottom 22 of the tank 10; however, edge 26 on front wall 24 and the corresponding edge on the rear wall (not shown) do extend far enough to be below water line 14.

Structure 16 is made airtight. Therefore, once air is evacuated, structure 16 will fill up to the top 17 with water. Obviously, it is necessary to add more water to the tank 10 as structure 16 fills up so that water line 14 does not drop below the lower edge 26 of front side wall 24 of structure 16. While structure 16 as illustrated is rectangular in shape (the basic outline of a skyscraper), it will be appreciated that many other shapes are possible. For example, the structure can be triangular, pyramid-shaped, semi-round, orb, spherical shaped or any other shape desired. It is preferable, however, that the structure have at least one side wall which is transparent so that the fish can be observed easily.

It has been found that most tropical fish very much enjoy the structures of the present invention and freely "explore" them on a regular basis. In order to entice fish 25 to enter the structure and become familiar with it, it is also possible to insert floating fish food below bottom edge 26 of front side wall 24 so that the food enters into the structure and rises to the top.

Figure 2:
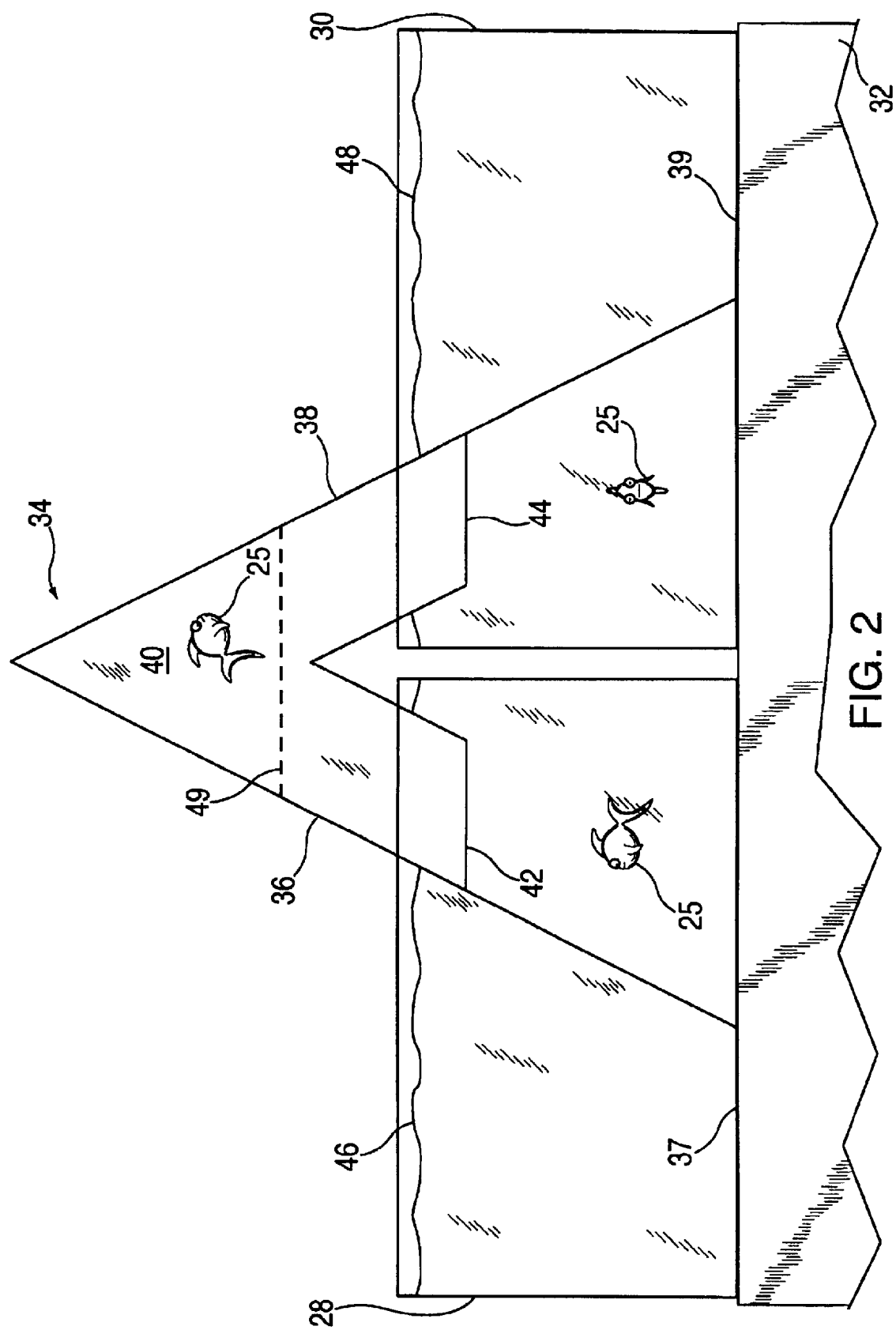
FIG. 2 shows an alternative embodiment with a triangular shaped structure connecting two tanks.

FIG. 2 shows an alternative embodiment in which there are two tanks 28 and 30 on a common stand 32. As shown in this embodiment, there is a triangular structure 34 having side walls 36 and 38 which extend to the bottoms 37 and 39 of tanks 28 and 30 respectively. Front wall 40 has two sections which extend into the respective tanks 28 and 30. The rear wall (not shown) is suitably constructed similarly to front wall 40. Bottom edge 42 is below the water line 46 of tank 28 and bottom edge 44 is below the water line 48 of tank 30. With this structure, fish 25 are able to move freely between tanks 28 and 30.

Structure 34 is not a water bridge, although it performs the same function as a water bridge, i.e. allowing water and aquatic animals to pass between two tanks. Rather, structure 34 is vertically oriented and extends upward, well above the water lines 46, 48 of tanks 28 and 30. In accordance with the present invention, imaginary line 49 can be considered the single opening or inlet of the present invention while the portion of structure 34 below line 49 is equivalent to a water bridge, and the portion of structure 34 above line 49 is the vertically oriented structure of the present invention.

Figure 3:
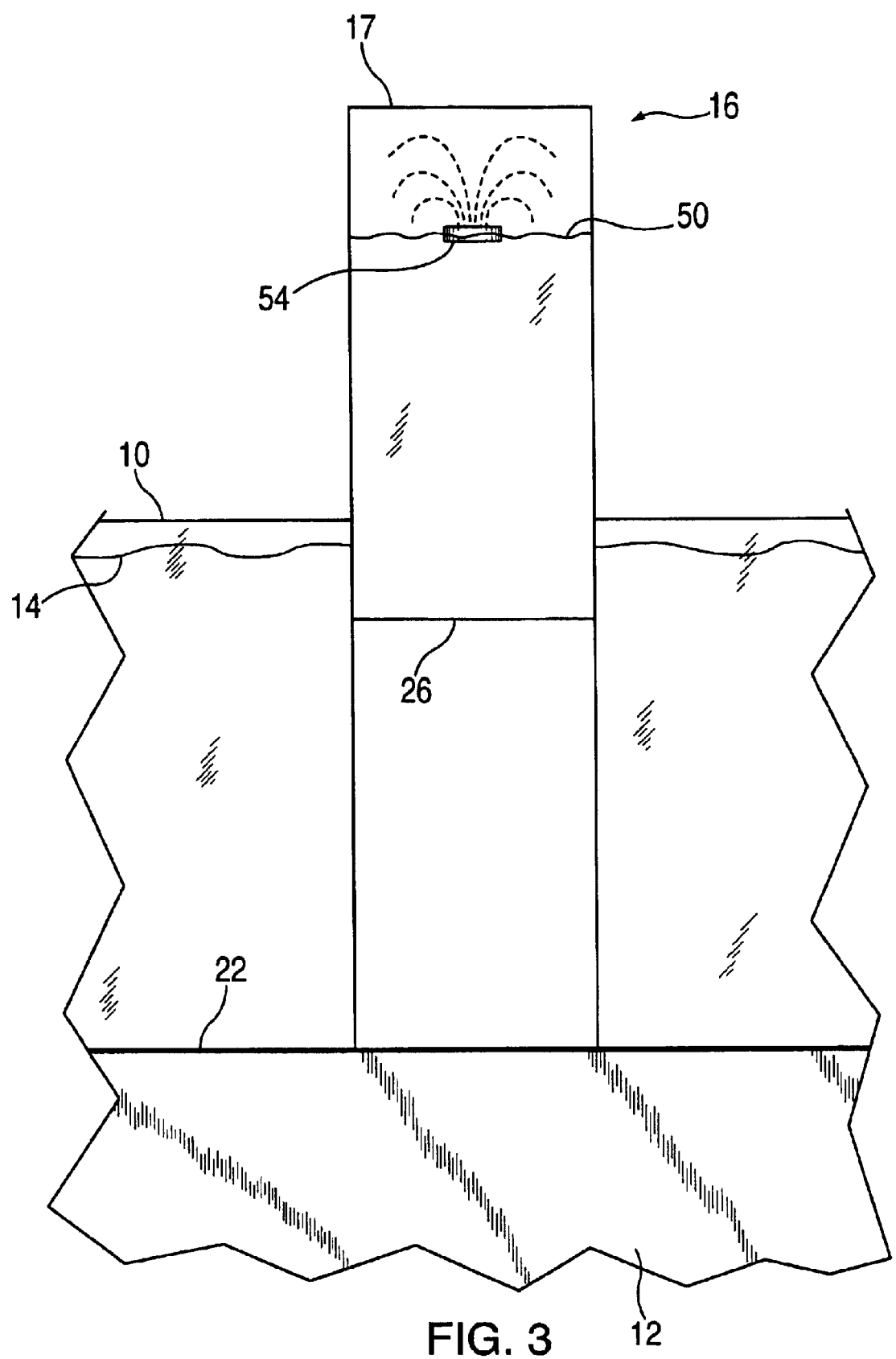
FIG. 3 shows an embodiment of the structure of FIG. 1 further including a water spray.

FIG. 3 shows a further embodiment of structure 16 of FIG. 1 in which the water inside structure 16 only extends to water level 50 rather than all the way to the top 17 of structure 16. A decorative spray head 54 rests atop water level 50 inside structure 16. Water spray 54 is suitably activated by connection to a pump (not shown) by means of a hose (also not shown). Since there is air in structure 16 between water level 50 and top 17, activation of the water spray will not raise water level 50.

Figure 4:
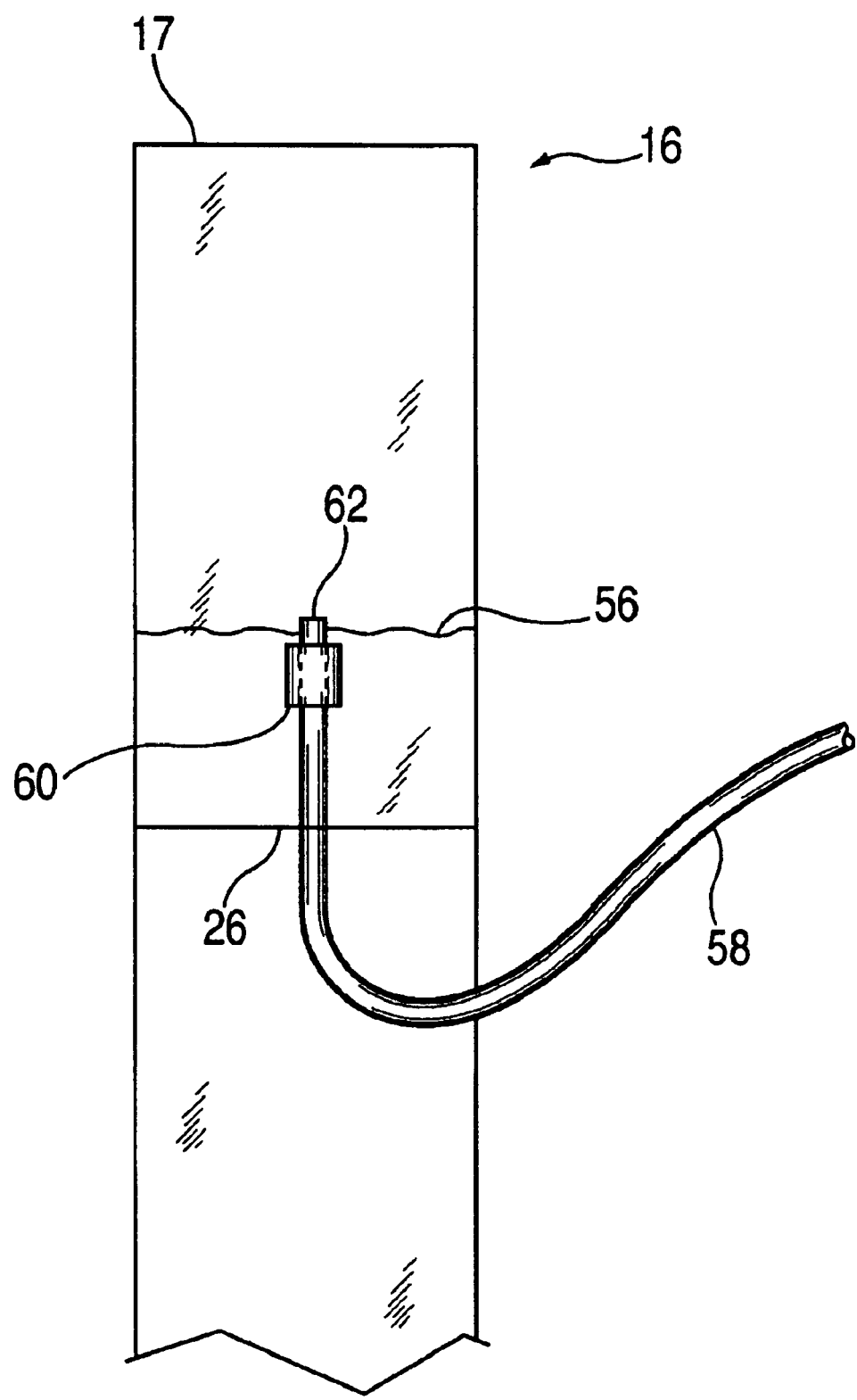
FIGS. 4 and 4A show ways in which air can be evacuated from a structure of the present invention.

FIG. 4 shows a system for adjusting the amounts of air and water in structure 16 of FIG. 1. A hose 58 extends out of the structure 16 and also out of the tank 10 (see FIG. 1). A float 60 keeps the top 62 of the hose at water level 56. As air is evacuated from structure 16 through hose 58, water level 56 will rise. The water level can be raised to any desired height, including to the top 17 of structure 16, or to the height of water level 50 of FIG. 3, or to any other level desired. Air can be evacuated through hose 58 either by use of a vacuum pump or by manually sucking on the hose, or by any other vacuum system.

Figure 4A:
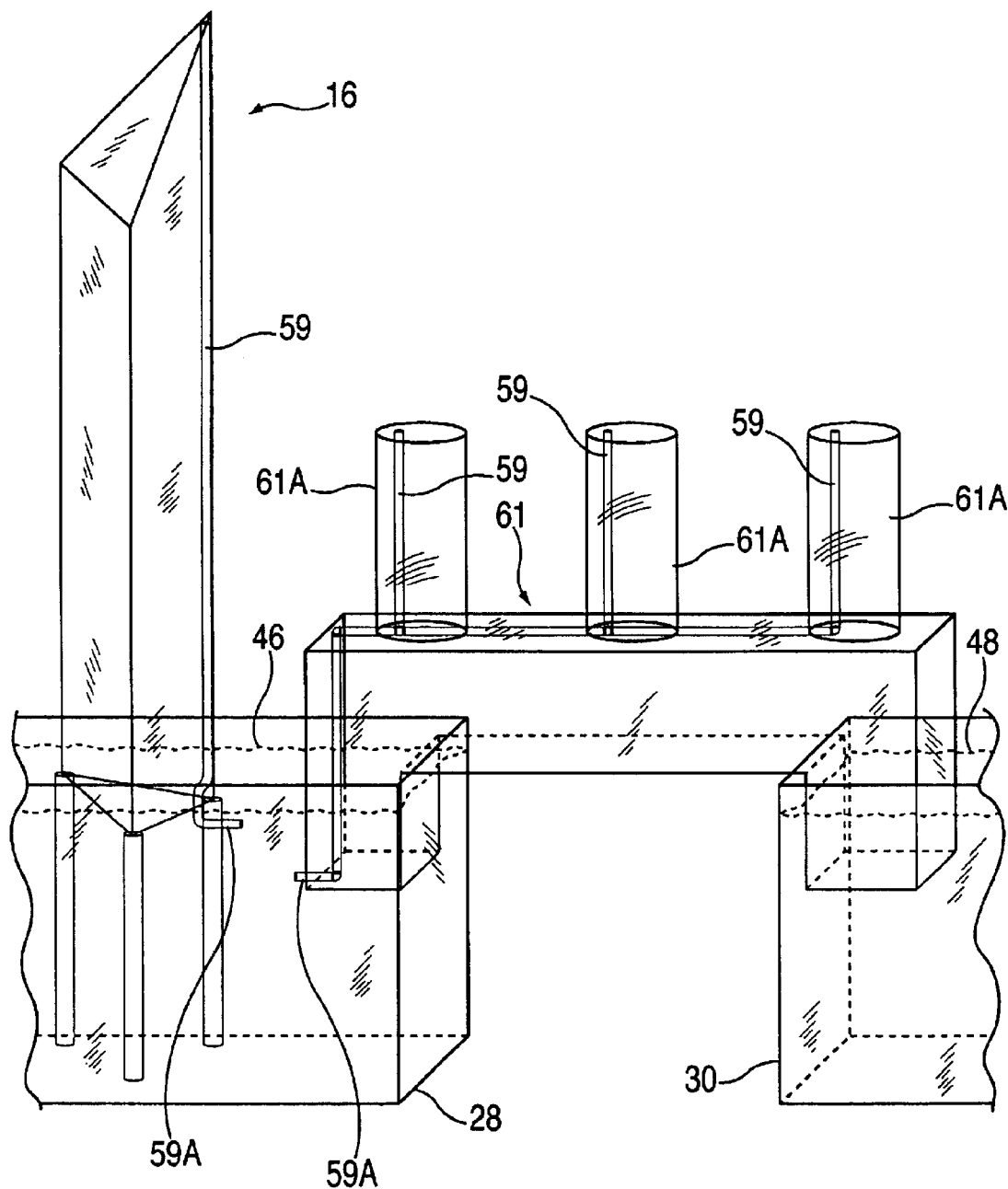

FIG. 4A illustrates yet another arrangement for adjusting the water and air in the present invention. In FIG. 4A, two tanks 28 and 30 have water bridge 61 with cylindrical tubes 61A (a vertically oriented structure of the present invention) extending upward off of the top wall of water bridge 61. Water bridge 61 extends between tanks 28 and 30 as shown. Tank 28 is also equipped with structure 16. Both structure 16 and water bridge 61 have fixed-position air extraction tubes 59. As will be appreciated, each cylindrical tube 61A can be equipped with an individual extraction tube to allow for variation in the height of the water in each of tubes 61A. Each extraction tube 59 has an outlet 59A for connection to a pump to extract air. Extraction tubes 59 are fixed to structure 16 and water bridge 61, either internally or externally. As shown in FIG. 4A, water bridge 61 rests on the sides of tanks 28 and 30 while structure 16 is supported by a base structure. As also shown in FIG. 4A, all of the extraction tubes 59 are connected to one pump; however, each tube 59 can be connected to a separate pump or valve to vary the height in each cylindrical tube 61A.

While FIGS. 4 and 4A show two systems for evacuating the air, many others are possible. For example, structure 16 can be totally submerged in the tank and then inverted and raised into place when it is full of water. It is also within the scope of the present invention to fill the structure with water, put a plate over the bottom edge 26 (see also FIG. 1), place the structure in the tank, and then remove the bottom plate. It is further within the contemplation of the present invention to have a valve at the top of structure 16 for evacuation of air (see FIG. 5); however, this construction is not preferred because the valve allows for tampering and detracts from the appearance and reliability of the structure.

Figure 5:
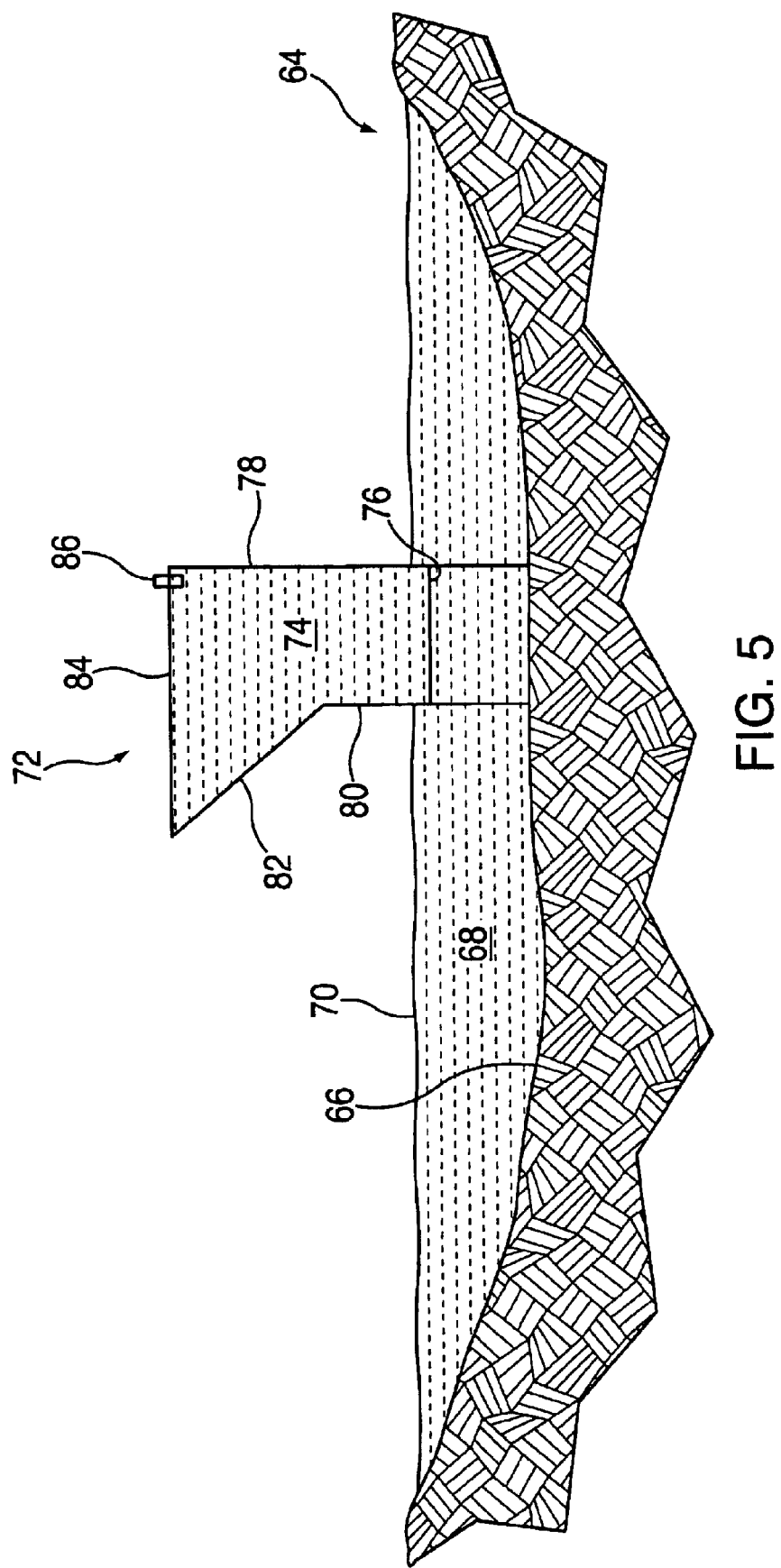
FIG. 5 shows a structure according to the present invention in a decorative pool.

Turning now to FIG. 5, there is shown a decorative pool 64 in cross-section having a bottom 66. Pool 64 is filled with water 68 up to water line 70 and a structure 72 according to the present invention rests therein. The structure 72 has a front side wall 74 having a bottom edge 76 which extends below the water line 70 of the pool. Side walls 78 and 80 extend to the bottom 66 of pool 64 to support the structure 72 in the pool 64. Side, wall 80 includes a cantilevered section 82 for additional visual interest. Water 68 has been introduced into structure 72 by evacuation of air from structure 72 up to the top 84 of structure 72. For evacuation of air, structure 72 has been fitted with a valve 86. The valve 86 is preferably a two-way valve so that air can be evacuated for filling the structure 72 with water 68 and then re-introduced for emptying water 68 from structure 72.

Figure 6:
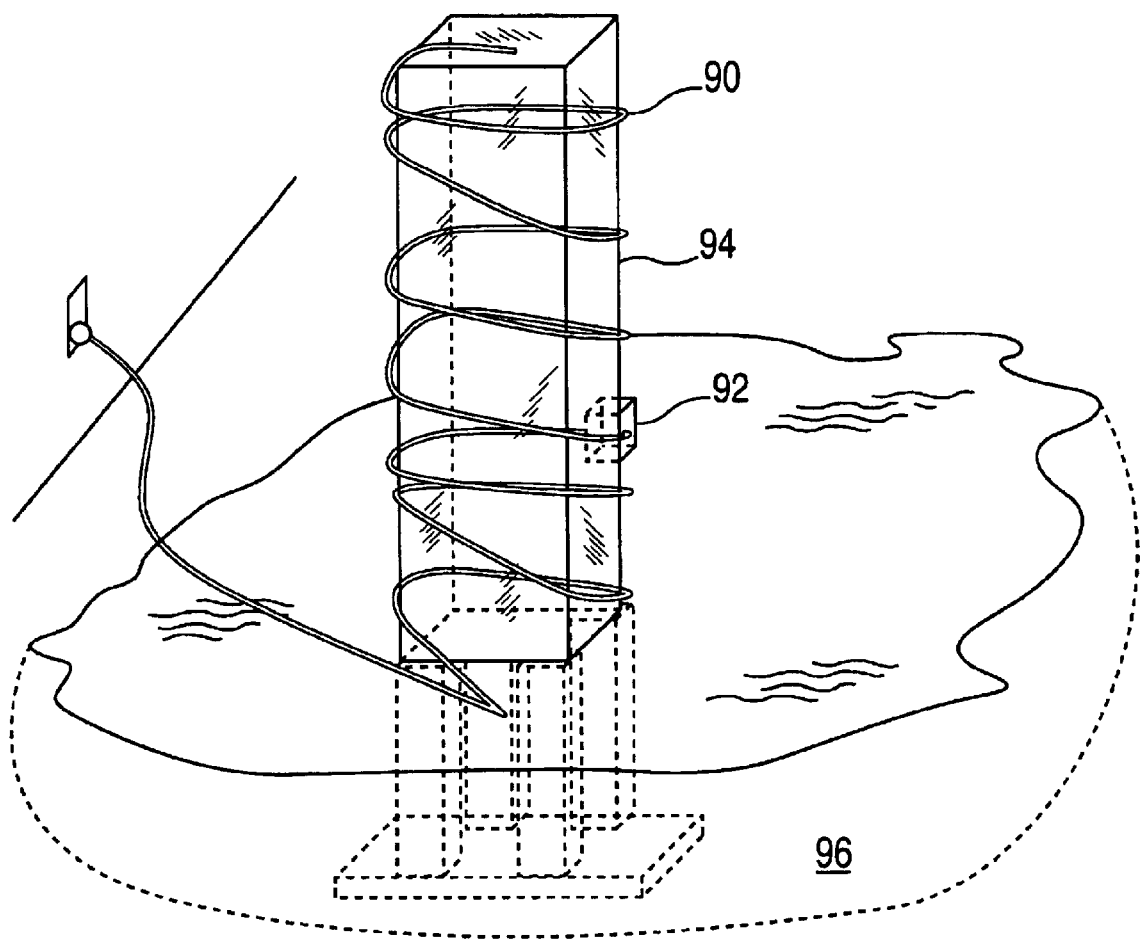
FIGS. 6 and 7 illustrate methods to prevent freezing of water in the present invention.
Figure 7:
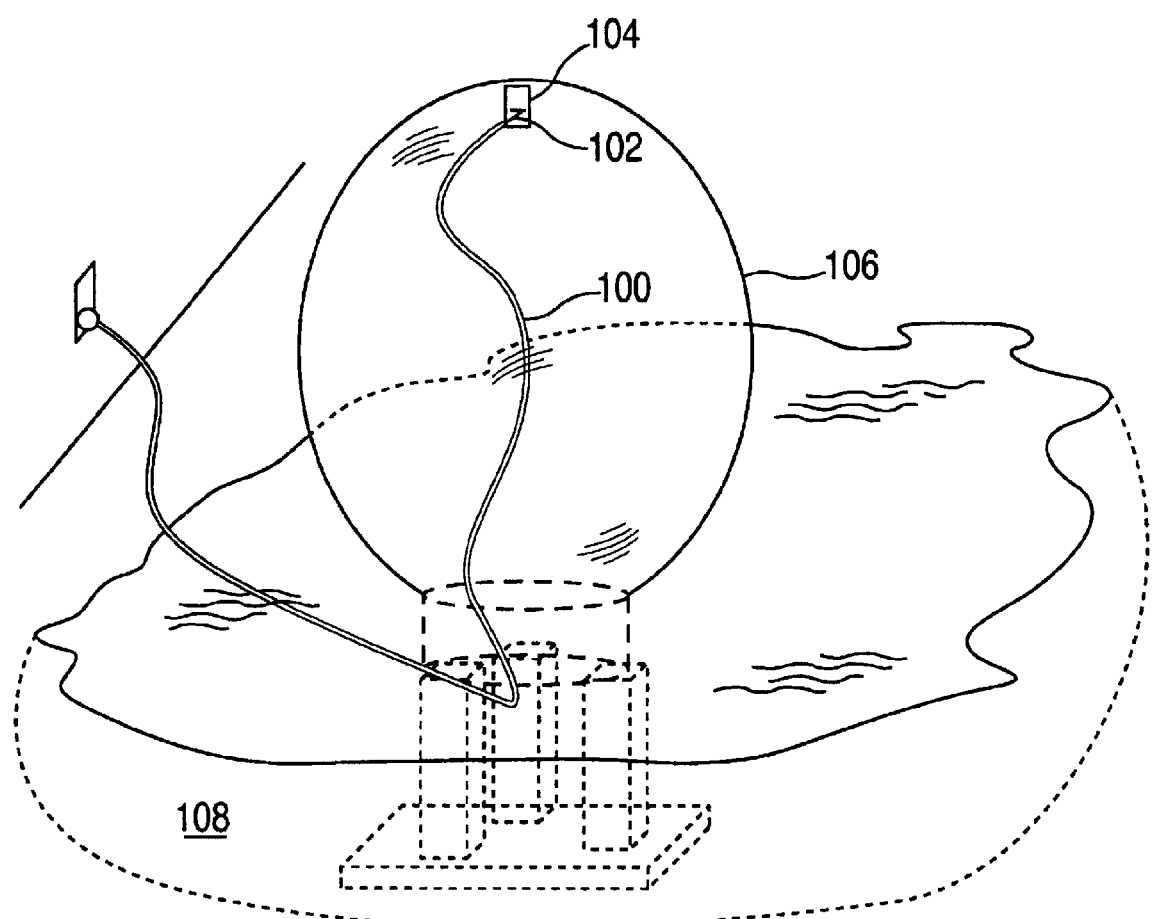

In the event that the pool 64 of FIG. 5 is outdoors and subject to winter freezing, a heating system should be employed to reduce the risk of the water 68 freezing, expanding and then ruining the structure 72. One suitable method, as shown in FIG. 6, is to have waterproof heat tape 90 and thermostat 92 attached to the outside of structure 94 in outdoor pond 96. An alternative method, as shown in FIG. 7, is to have waterproof heating tape 100 and thermostat 102 attached to float 104 and floating within the structure 106 in outdoor pond 108. Other methods of preventing the structure from freezing in winter conditions will readily occur to those skilled in the art, e.g. a standard aquarium heater, pumping in of warm water, heating the entire pool, and the like.

While the present invention has primarily been described in terms of use with a standard indoor aquarium, it has been found that it is equally useful and decorative in any type of water construction, including a pond, a fountain, a stream, in the ocean, etc. It will be understood that in the ocean or a lake, where the water level fluctuates due to tide or drought, special precautions need to be taken to ensure that the water level does not fall below the lower edge of the structure of the present invention. These special precautions can include building a tank around the structure or allowing the structure to rise and fall with the rise and fall of the water level.

While structures 16 (FIG. 1) and 34 (FIG. 2) are shown with side walls extending all the way to the bottom of the body of water, the structures according to the present invention can be mounted in any way desired, e.g. by having additional apparatus which extend from the sides of the tank and hold the structure in place as shown in FIGS. 4A, 6 and 7. It should be noted that in FIG. 7 a collar is employed to support structure 106 on top of legs and a base. The important feature is that the structure be supported so that all of its sides extend below the water line in the body of water in which it resides, thus providing an airtight volume within the structure.

Figure 8:
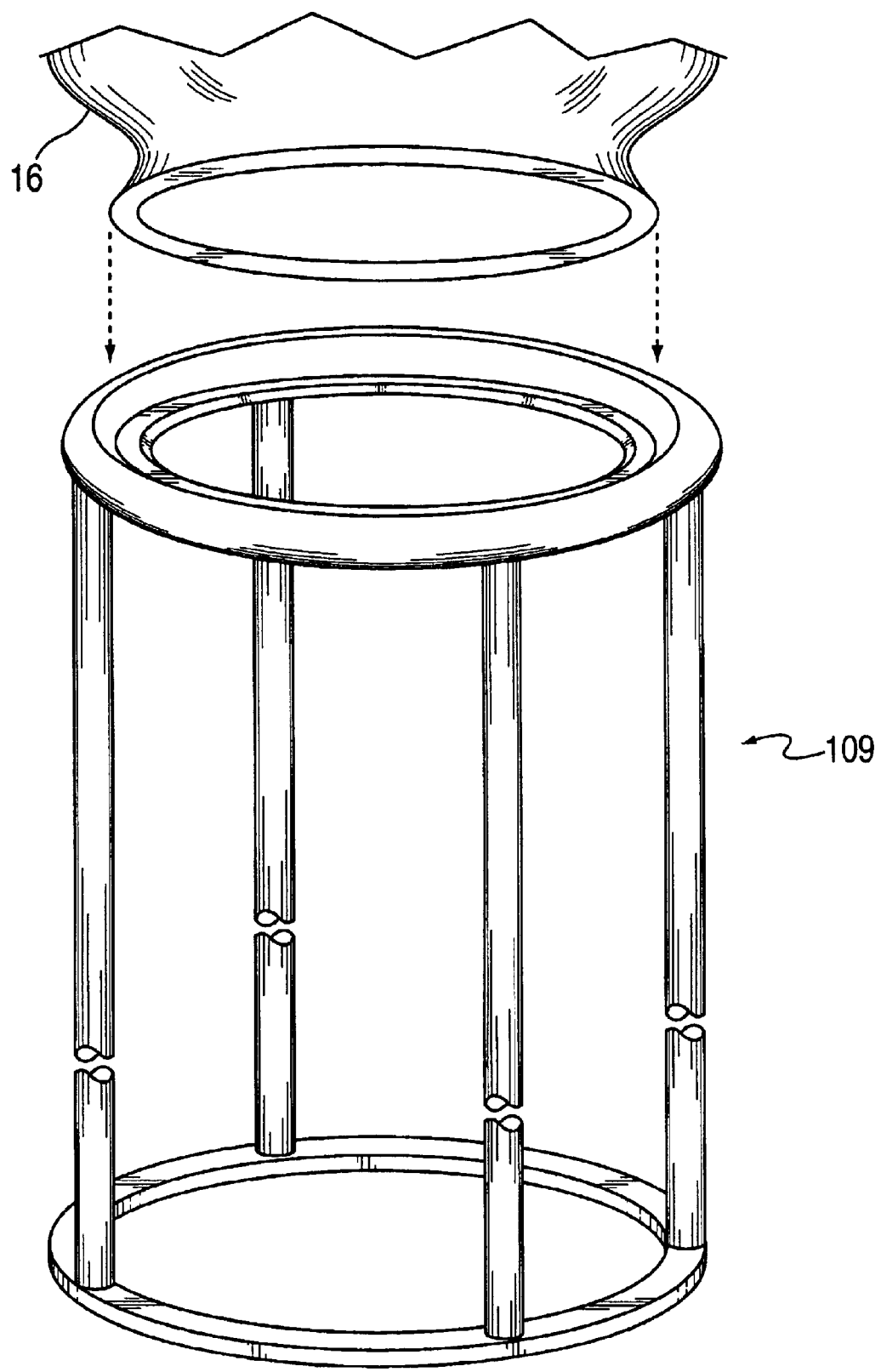
FIGS. 8 and 9 illustrate base structures of the present invention.
Figure 9:
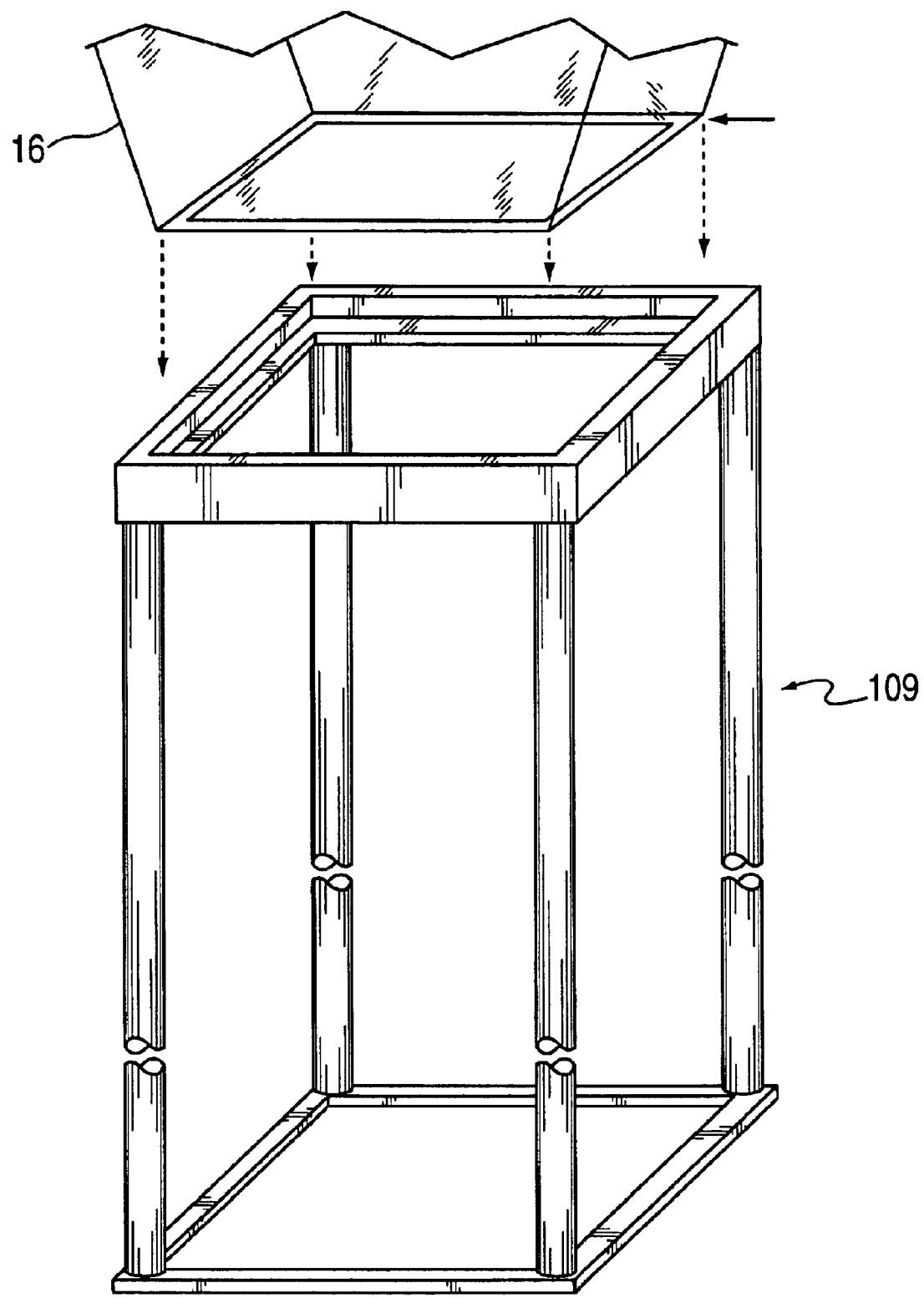

FIGS. 8 and 9 illustrate other base structures which can be used with the structure of the present invention wherein base 109 supports structure 16. The legs on base 109 are preferably adjustable to allow for variation in the height of the water level in the tank, pond, lake, ocean, etc. Suitable support for the structure includes apparatus that allow for the structure to straddle the rim of a tank, sit on the bottom of the tank, or be supported from outside the tank. The support apparatus can be integrated into the structure, such as simply adding side holes to a tank, or separate from the structure.

It will be appreciated that any conventional airtight structure can be used to make the structure of the present invention provided it is employed in accordance with the teachings of the present invention.

Figure 10:
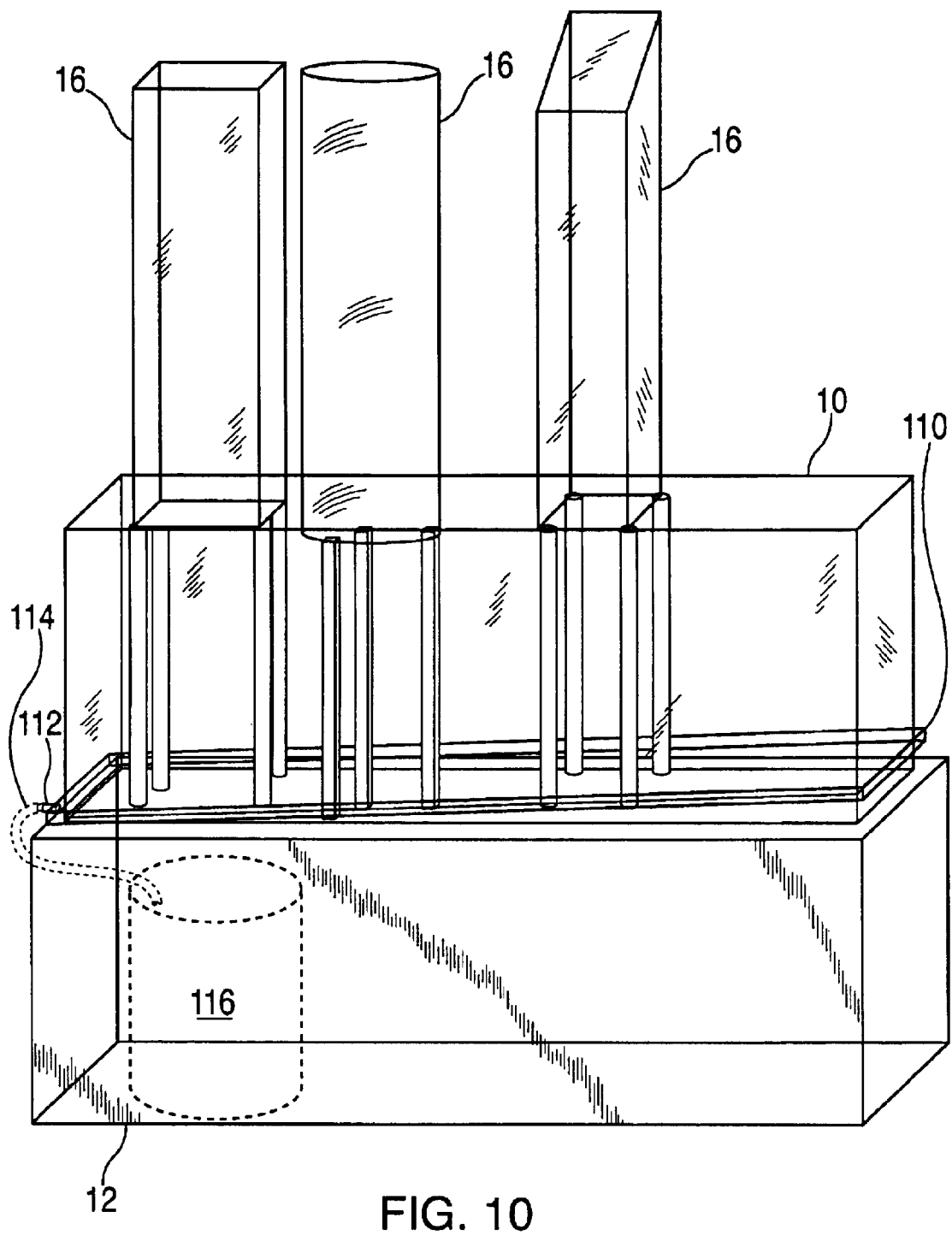
FIG. 10 illustrates an overflow arrangement for the tank.

FIG. 10 illustrates a way to catch overflow water from the aquarium tank 10. As shown, channel 110 is wrapped around tank 10 such that water flowing over the top of tank 10 flows down, by gravity, into channel 110. Channel 110 is inclined to allow water to flow to outlet 112 of channel 110. Tube 114 is connected to outlet 112 and to catch tank 116 such that water flows in channel 110 to outlet 112, through tube 114 and into catch tank 116. Catch tank 116 can hold all of the water in structure 16 and, more preferably, all the water in structures 16 and tank 10.

Figure 11:
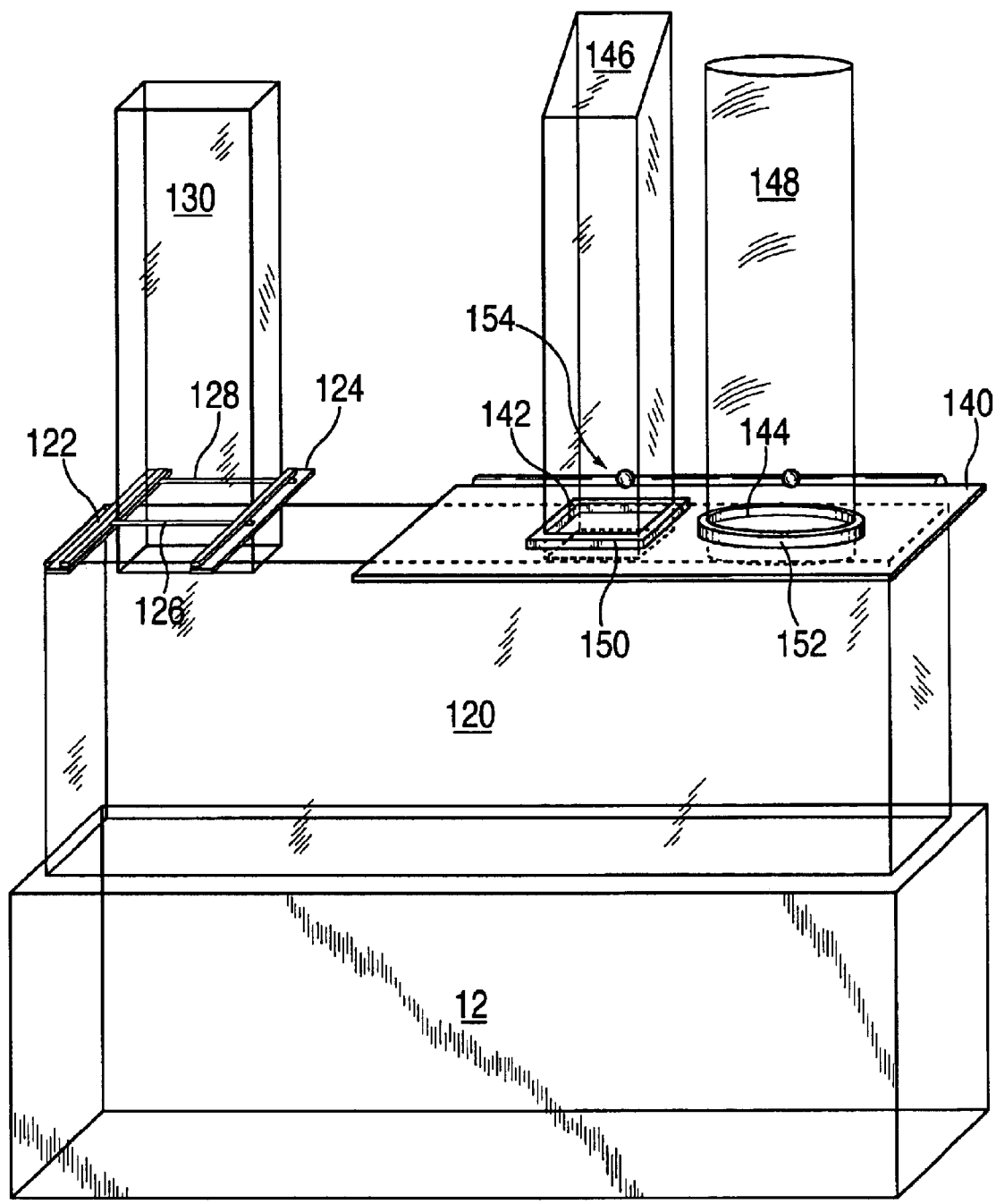
FIG. 11 illustrates another support arrangement for the structure of the present invention.

FIG. 11 illustrates another support structure of the present invention. Tank 120 employs support beams 122 and 124 which span the top of tank 120 and rods 126 and 128 which are affixed to the side of vertically oriented structure 130 of the present invention. The open bottom of structure 130 allows for fluid communication with the water in tank 120. Also as illustrated in FIG. 11, top 140 spans the top of tank 120 and has holes 142 and 144 through which the bottom of vertical structures 146 and 148 extend downward to below the water level in tank 120. Collars 150 and 152 are affixed to structures 146 and 148 to suspend structures 146 and 148 from top 140 and allow the sides of structures 146 and 148 to extend down below the water level in tank 120. An integrated lighting system 154 is employed to highlight structures 146 and 148. Obviously, top 140 can facilitate use of other standard aquarium items such as lights.

Figure 12:
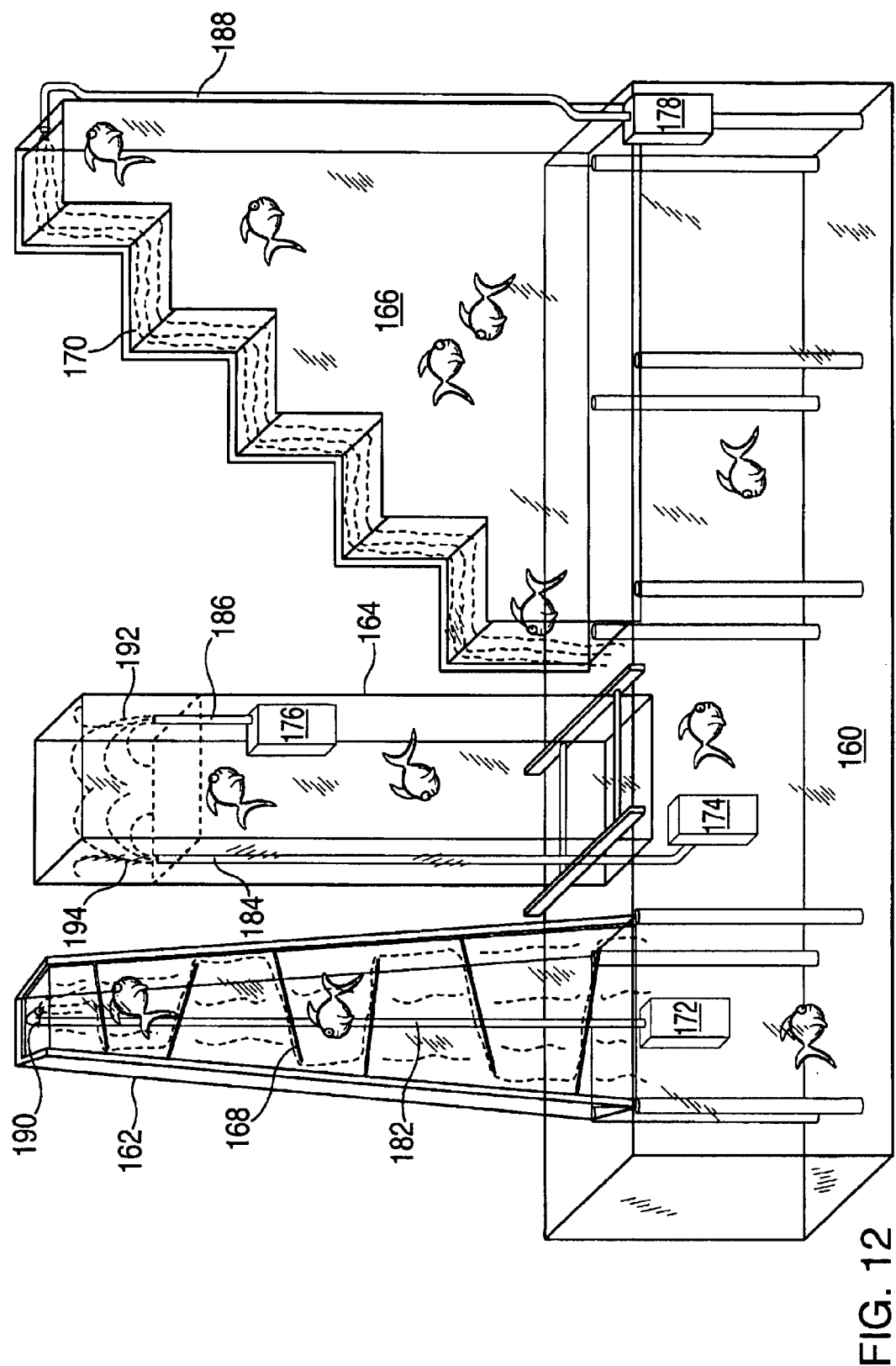
FIG. 12 illustrates the structure of the present invention with waterfalls on the outside of the structure.

FIG. 12 illustrates tank 160 with three vertical structures 162, 164 and 166. Vertical structures 162 and 166 have spillways 168 and 170 that allow water to cascade down from the top of the vertical structure and into tank 160. Pumps 172, 174, 176 and 178 with respective hosing 182, 184, 186 and 188 allow water to be pumped from tank 160 upward. Hose 188 runs exterior to structure 166 while hose 182 is interior to structure 162 and runs through airtight opening 190 in the top of structure 162. Structure 164 has two pumps at different locations to create two internal fountains 192, 194. The pumps can be connected to a filtration system.

Figure 13:
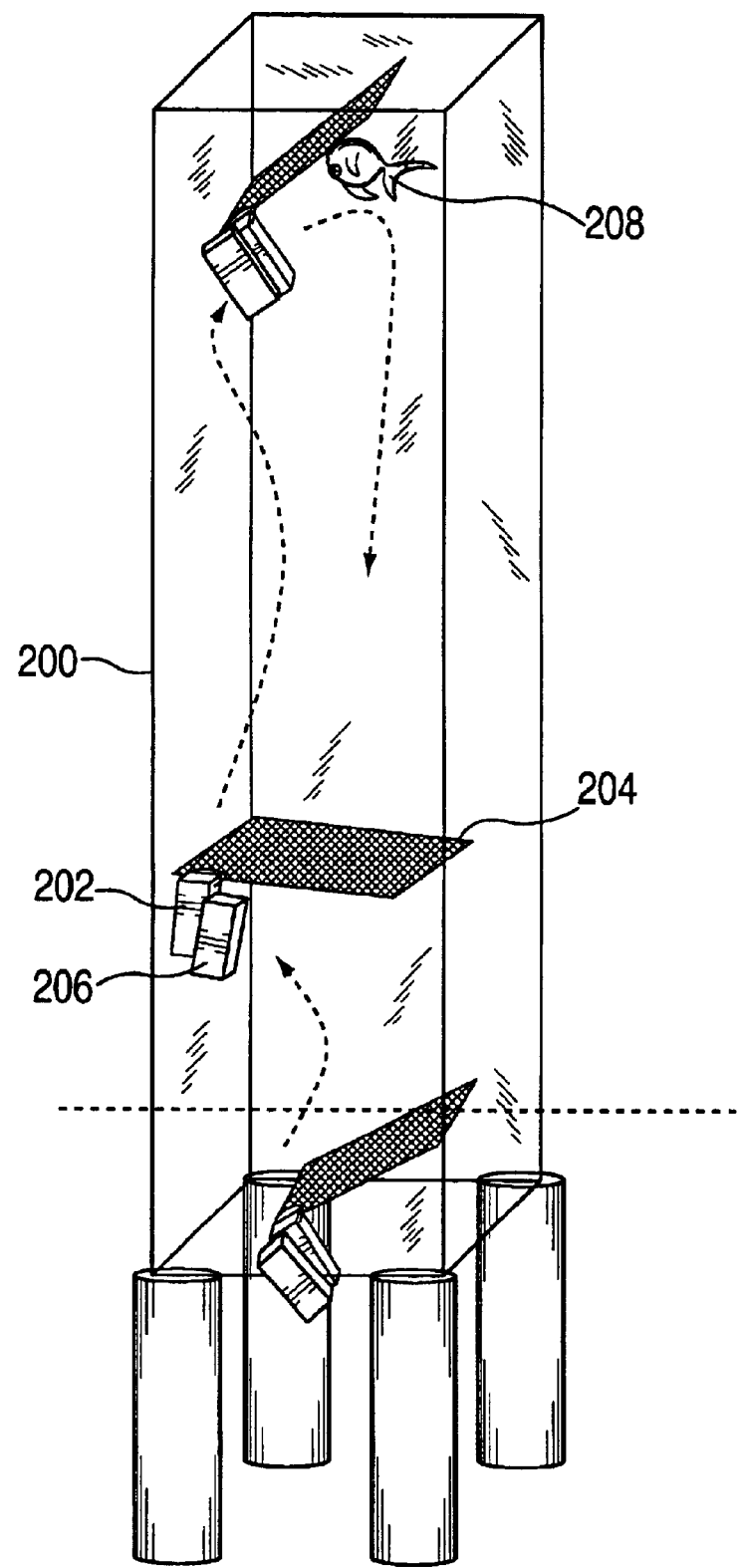
FIG. 13 illusrates a two part magnet system with an attached net or screen to retrieve waste or a dead fish without having to empty the structure.

FIG. 13 illustrates structure 200 filled with water. Internal magnet 202 with attached screen 204 or net is placed inside the structure 200 and controlled by external magnet 206 to capture waste or floating plant or dead fish 208 for removal. As shown in FIG. 13, first the two magnets 202, 206 are inserted, then the external magnet 206 guides internal magnet 202 with attached screen 204 upward to retrieve dead fish 208. Finally, external magnet 206 is moved downward to guide internal magnet 202 with dead fish 208 downward to the opening of structure 200.

It will be understood that the claims are intended to cover all changes and modifications of the preferred embodiments of the invention herein chosen for the purpose of illustration which do not constitute a departure from the spirit and scope of the invention.

What is claimed is:

1. A vertical structure for enhancing the appearance of a body of water, said structure having a bottom wall and a single opening located in said bottom wall, said structure being adapted to extend above the body of water and having side walls which are adapted to extend into the body of water to form an airtight chamber which can be filled with water, wherein said structure has a means for filling said airtight chamber with said water comprising:
    a) a hose and float mechanism, wherein said float maintains a first end of said hose above said water within said airtight chamber, and wherein a second end of said hose is used to evacuate air from within said airtight chamber thereby causing said water to rise within said airtight chamber.

2. The structure of claim 1 supported in a standard indoor aquarium tank.

3. The structure of claim 1 wherein at least one of said side walls is planar.

4. The structure of claim 1 further comprising a heating means to avoid freezing of said body of water.

5. The structure of claim 1 further comprising a spray head adapted to spray water within said structure.

6. The structure of claim 1 in the shape of a skyscraper.

7. The structure of claim 1 including a cantilevered side wall.

8. The structure of claim 1 further including a valve for evacuation of air.

9. The structure of claim 8 wherein the valve is at the top of the structure.

10. The structure of claim 1 wherein at least two of said side walls are adapted to extend to the bottom of the body of water.

11. The structure of claim 1 in combination with at least one body of water.

12. The structure of claim 11 wherein the body of water is contained within a standard indoor aquarium tank.

13. The structure of claim 11 wherein the body of water is a pool.

14. The structure of claim 11 wherein there are two bodies of water connected by a bridge to permit fish to swim from one said body of water to the other said body of water and a portion of said structure extends above said bridge.

15. The structure of claim 14 wherein each body of water is contained within a standard indoor aquarium tank.

16. A method for increasing the volume of an aquarium comprising:

(a) adding a vertical structure to an aquarium wherein said structure extends above a body of water in said aquarium and said structure extends into said body of water, said structure being airtight; and (b) evacuating said structure so as to remove air from inside said structure and allow water from said body of water to rise up into said structure, wherein said evacuating is accomplished using a hose and float mechanism comprising a float to maintain a first end of said hose above said water within said structure and a second end of said hose to evacuate air from within said structure thereby causing said water to rise within said structure.

17. The method of claim 16 further comprising the step of adding water to said body of water to maintain said body of water at a constant level in said aquarium.

18. The method of claim 16 wherein said evacuating is conducted to fully evacuate said structure and allow said structure to be filled with water.

19. The method of claim 16 wherein said evacuating is conducted to partially evacuate said structure and allow said structure to be partially filled with water.

20. A method for evacuating an airtight structure or an airtight bridge which is in fluid communication with one or more bodies of water comprising:

(a) inserting one end of a hose into said structure or bridge wherein a float maintains said one end of said hose above said water;

(b) connecting a vacuum pump to the other end of the hose; and (c) pumping the air out off the structure while allowing the water in the body of water to rise up into the structure or bridge.

21. A method of removing a dead floating fish, waste or plant in a body of water comprising using an internal magnet with an attached net or screen and an external magnet to operate said internal magnet to remove said fish, waste or plant without emptying said body of water.

* * * * *